United States Patent
Sharma et al.

(10) Patent No.: US 7,012,785 B2
(45) Date of Patent: Mar. 14, 2006

(54) METHOD AND APPARATUS FOR HEAD SLIDER AND SUSPENSION REDUCING AIR FLOW TURBULENCE ABOUT THE SLIDER WHEN ACCESSING A ROTATING DISK IN A DISK DRIVE

(75) Inventors: Vinod Sharma, Los Gatos, CA (US); Joseph Chang, San Jose, CA (US); Debasis Baral, San Jose, CA (US)

(73) Assignee: Samsung Electronics Co., Ltd., Suwon (KR)

(*) Notice: Subject to any disclaimer, the term of this patent is extended or adjusted under 35 U.S.C. 154(b) by 173 days.

(21) Appl. No.: 10/266,539

(22) Filed: Oct. 7, 2002

(65) Prior Publication Data

US 2004/0066580 A1 Apr. 8, 2004

(51) Int. Cl.
*G11B 5/60* (2006.01)

(52) U.S. Cl. .................................. 360/234.2; 360/236.4
(58) Field of Classification Search .............. 360/234.2, 360/235.4–237.1
See application file for complete search history.

(56) References Cited

U.S. PATENT DOCUMENTS

| | | | | |
|---|---|---|---|---|
| 4,163,267 A | * | 7/1979 | DeMoss | 360/224 |
| 6,104,571 A | * | 8/2000 | Kabasawa | 360/236.4 |
| 6,157,518 A | * | 12/2000 | Koishi et al. | 360/235.5 |
| 6,603,638 B1 | * | 8/2003 | Yotsuya | 360/235.6 |

* cited by examiner

*Primary Examiner*—A. J. Heinz
(74) *Attorney, Agent, or Firm*—GSS Law Group; Jeffrey P. Aiello; Earle Jennings

(57) ABSTRACT

The invention includes head gimbal assemblies, actuators, and disk drives containing at least one airfoil boundary reducing air flow turbulence about a slider induced by said head gimbal assembly accessing a rotating disk surface.

24 Claims, 4 Drawing Sheets

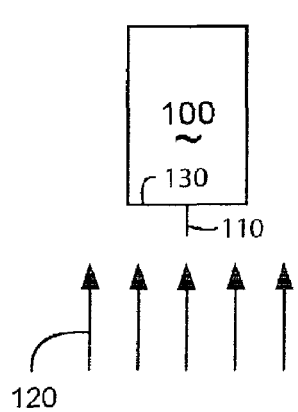 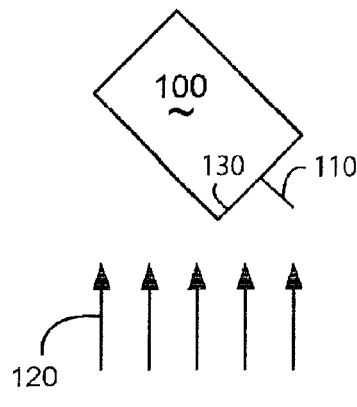 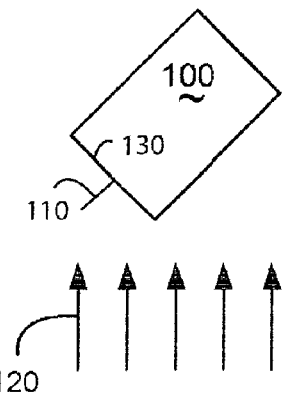
Fig. 4A         Fig. 4B         Fig. 4C
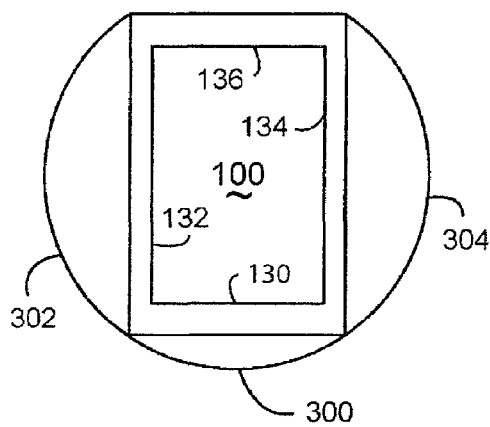 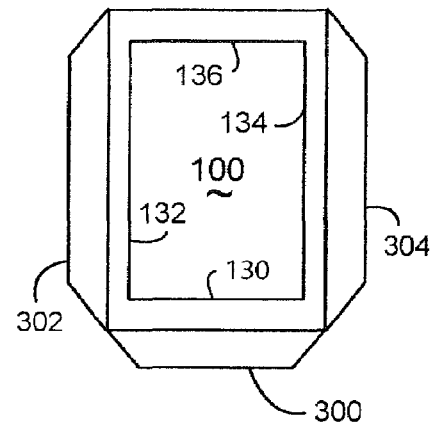
Fig. 4D         Fig. 4E
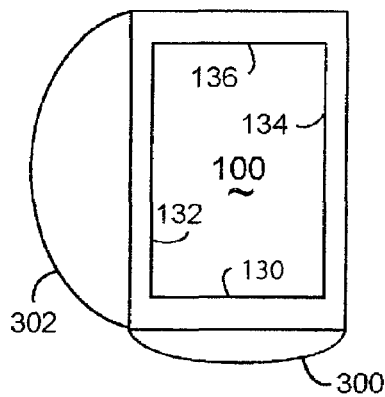 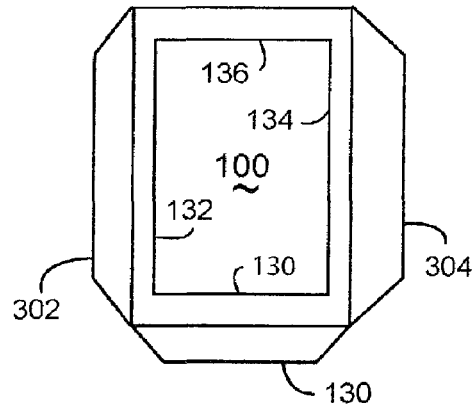
Fig. 4F         Fig. 4G

METHOD AND APPARATUS FOR HEAD SLIDER AND SUSPENSION REDUCING AIR FLOW TURBULENCE ABOUT THE SLIDER WHEN ACCESSING A ROTATING DISK IN A DISK DRIVE

TECHNICAL FIELD

This invention relates to reducing air flow induced turbulence around a read-write head accessing a rotating disk in a disk drive to improve the read-write head's reliability.

BACKGROUND ART

Disk drives are an important data storage technology. Read-write heads are one of the crucial components of a disk drive, directly communicating with a disk surface containing the data storage medium. During normal operation, the read-write heads travel on an air bearing generated by their shape with respect to a nearby, rapidly rotating disk surface. Today, the disk surface typically rotates at about 4500 RPM for laptop computer disk drives and 7200 RPM for desktop computer disk drives, but the industry is moving toward much higher rotational rates. As the rotational rate of a disk surface increases, so does the wind speed acting upon the slider containing the read-write head.

Simultaneously, the Tracks Per Inch (TPI) in disk drives is rapidly increasing, leading to smaller and smaller track positional tolerances. The track position tolerance, or the offset of the read-write head from a track, is monitored by a signal known as the head Positional Error Signal (PES). Reading a track successfully usually requires minimizing read-write head PES occurrences. The effect of increasing rotational rates and TPI creates a need to minimize air flow induced turbulence around the read-write head while accessing tracks on the rotating disk surface.

FIG. 1A illustrates a typical prior art high capacity disk drive 10 including actuator arm 30 with voice coil 32, actuator axis 40, actuator arms 50–58 with head gimbal assembly 60 placed among the disks.

FIG. 1B illustrates a typical prior art, high capacity disk drive 10 with actuator 20 including actuator arm 30 with voice coil 32, actuator axis 40, actuator arms 50–56 and head gimbal assembly 60–66 with the disks removed.

FIG. 2A illustrates a suspended head gimbal assembly 60 containing the MR read-write head 200 of the prior art.

Since the 1980's, high capacity disk drives 10 have used voice coil actuators 20–66 to position their read-write heads over specific tracks. The heads are mounted on head gimbal assemblies 60–66, which float a small distance off the disk drive surface when in operation. The air bearing referred to above is the flotation process. The air bearing is formed by the rotating disk surface 12, as illustrated in FIGS. 1A–1B, and slider head gimbal assembly 60, as illustrated in FIGS. 1A–2A.

Often there is one head per head slider for a given disk drive surface. There are usually multiple heads in a single disk drive, but for economic reasons, usually only one voice coil actuator.

Voice coil actuators are further composed of a fixed magnet actuator 20 interacting with a time varying electromagnetic field induced by voice coil 32 to provide a lever action via actuator axis 40. The lever action acts to move actuator arms 50–56 positioning head gimbal assemblies 60–66 over specific tracks with speed and accuracy. Actuators 30 are often considered to include voice coil 32, actuator axis 40, actuator arms 50–56 and head gimbal assemblies 60–66. An actuator 30 may have as few as one actuator arm 50. A single actuator arm 52 may connect with two head gimbal assemblies 62 and 64, each with at least one head slider.

Head gimbal assemblies 60–66 are typically made by rigidly attaching a slider 100 to a head suspension including a flexure providing electrical interconnection between the read-write head in the slider and the disk controller circuitry. The head suspension is the visible mechanical infrastructure of 60–66 in FIGS. 1A to 2A. Today, head suspension assemblies are made using stainless steal in their suspension and beams. The head suspension is a steel foil placed on a steel frame, coated to prevent rust. It is then coated with photosensitive material. The suspension and flexures are photographically imprinted on the photosensitive material, which is then developed. The developed photo-imprinted material is then subjected to chemical treatment to remove unwanted material, creating the raw suspension and flexure.

Actuator arms 50–56 are typically made of extruded aluminum, which is cut and machined.

FIG. 2B illustrates the relationship between the principal axis 110 of an actuator arm 50 containing head gimbal assembly 60, which in turn contains slider 100, with respect to a radial vector 112 from the center of rotation of spindle hub 80 as found in the prior art.

FIG. 2C illustrates the tip of the head gimbal assembly 60 containing slider 100, with first edge 130 regarding both the principal axis 110 of the actuator and primary wind direction 120 as found in the prior art.

As those skilled in the art realize, contemporary sliders 100 may possess not only a tapered first edge 130, but may also possess a flat first edge 130. In the Figures of the patent application, the first edge 130 will shown as tapered whenever reasonable to aid the reader in understanding the invention. However, this is not being done to limit the scope of the claims.

The actuator arm assembly 50–60–100, pivots about actuator axis 40, changing the angular relationship between the radial vector 112 and the actuator principal axis 110. Typically, an actuator arm assembly 50–60–100 will rotate through various angular relationships. The farthest inside position is often referred to as the Inside Position. The position where radial vector 112 approximately makes a right angle with 110 is often referred to as the Middle Position. The farthest out position where the read-write head 100 accesses disk surface 12 is often referred to as the Outside Position.

The primary wind direction 120 is essentially tangential, or perpendicular to the radial vector 112. As illustrated in FIG. 2C, the primary wind direction 120 and principal actuator axis 110 are not necessarily parallel.

To summarize, what is needed a way to minimize air flow induced turbulence around the read-write head while accessing a rotating disk surface.

SUMMARY OF THE INVENTION

The invention provides at least a way to minimize air flow induced turbulence around the read-write head while accessing the rotating disk surface, increasing the reliability of the read-write head accessing the rotating disk surface by reducing track positional errors (PES). The invention includes head gimbal assemblies, actuators, and disk drives containing at least one airfoil boundary reducing air flow turbulence about a slider induced by the head gimbal assembly accessing a rotating disk surface.

The invention operates a head gimbal assembly including at least one slider for a read-write head by: Rotating a disk surface near the slider to engage the read-write head. And providing at least one airfoil boundary to the read-write head conforming to the slider air bearing to reduce air flow turbulence around the read-write head.

The airfoil boundaries increase the communication reliability of the read-write head with the rotating disk surface. Each airfoil boundary has a height less than or equal to the height of the slider and conforms to the air bearing.

The head gimbal assembly preferably includes a rigidly attached layer and/or pad forming at least one airfoil boundary.

These and other advantages of the present invention will become apparent upon reading the following detailed descriptions and studying the various figures of the drawings.

BRIEF DESCRIPTION OF THE DRAWINGS

FIG. 4A schematically illustrates the primary wind direction 120 with respect to head slider 100, first edge 130, and principal axis 110 for the Middle Position;

FIG. 4B schematically illustrates the primary wind direction 120 with respect to head slider 100, first edge 130, and principal axis 110 for the Inside Position;

FIG. 4C schematically illustrates the primary wind direction 120 with respect to head slider 100, first edge 130, and principal axis 110 for the Outside Position;

FIG. 4D illustrates a head gimbal assembly including an airfoil boundary 300 near not only the first slider edge 130, but also airfoil boundaries 302 and 304 near two parallel edges 132 and 134, respectively, connecting first slider edge 130 and second slider edge 136 near the read-write head 200;

FIG. 4E illustrates a head gimbal assembly including several airfoil boundaries near not only the first slider edge 130, but also near two parallel slider edges 132 and 134, connecting first slider edge 130 and second slider edge 136 near the read-write head 200;

FIG. 4F illustrates a head gimbal assembly including an airfoil boundary near not only the first slider edge 130, but also near one of two parallel slider edges 132, connecting first slider edge 130 and second slider edge 136 near the read-write head 200; and FIG. 4G illustrates a head gimbal assembly including several airfoil boundaries near not only the first slider edge 130, but also near two parallel, but non-symmetric slider edges 132 and 134, connecting first slider edge 130 and second slider edge 136 near the read-write head 200.

DETAILED DESCRIPTION OF THE INVENTION

The invention includes head gimbal assemblies, actuators, and disk drives containing at least one airfoil boundary reducing air flow turbulence around an included slider, when the read-write head of the slider accesses a rotating disk surface.

The invention operates by a disk drive and an actuator, including at least one slider for a read-write head by rotating a disk surface near the slider to engage the read-write head, based upon an air bearing formed by rotating disk surface and suspension and slider containing the read-write head. And providing at least one airfoil boundary to the read-write head conforming to the air bearing to reduce air flow turbulence around the read-write head.

The airfoil boundaries increase the communication reliability of the read-write head with the rotating disk surface. Each airfoil boundary has a height less than or equal to the height of the slider and conforms to the air bearing.

Figure 3A:
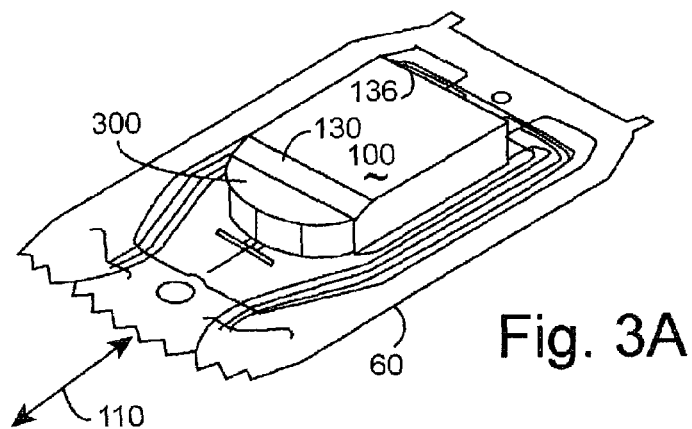
FIG. 3A illustrates a head gimbal assembly 60 close-up showing slider 100 with first edge 130 and airfoil boundary 300.

FIG. 3A illustrates a head gimbal assembly 60 close-up showing slider 100 with first edge 130 and airfoil boundary 300.

Figure 3B:
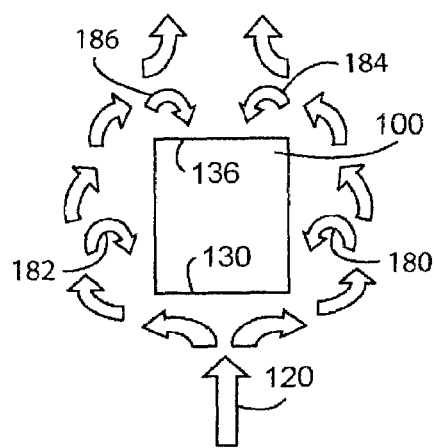
FIG. 3B illustrates schematically the flow of air about the slider 100 including turbulence 180 and 182 inducing mechanical vibration upon the slider 100 body as found in the prior art.

FIG. 3B illustrates schematically the flow of air about the slider 100 including turbulence 180 and 182 inducing mechanical vibration upon the slider 100 body as found in the prior art.

Figure 3C:
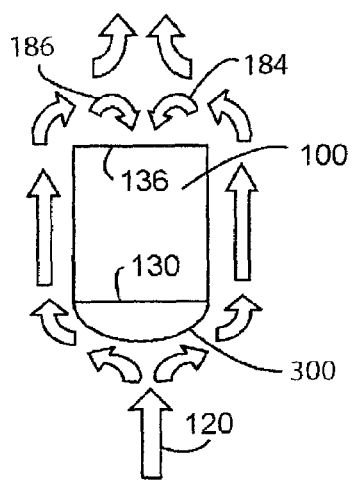
FIG. 3C illustrates schematically the effect of airfoil boundary 300 in reducing air flow turbulence around slider 100, leading to reduced mechanical vibration upon the slider 100 body.

FIG. 3C illustrates schematically the effect of airfoil boundary 300 in reducing air flow turbulence around slider 100, leading to reduced mechanical vibration upon the slider 100 body.

Figure 1A:
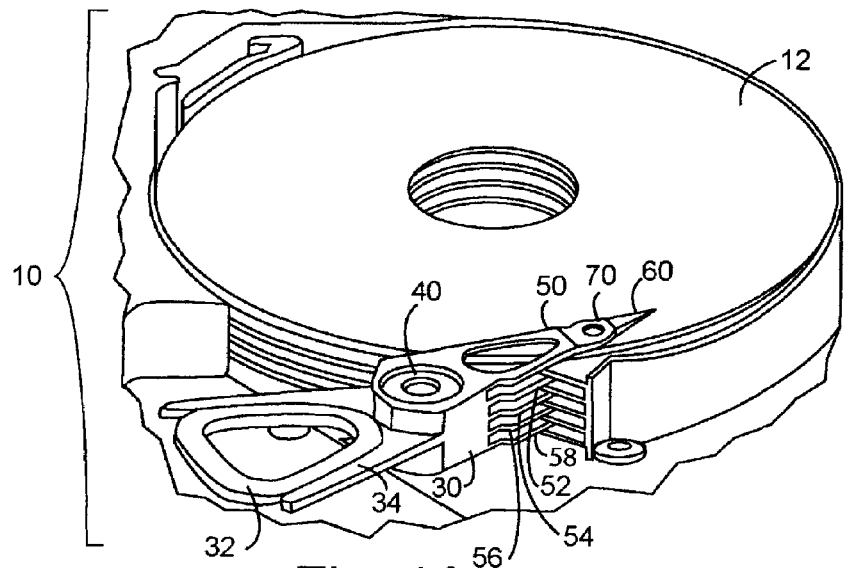
FIG. 1A illustrates a typical prior art high capacity disk drive 10 including actuator arm 30 with voice coil 32, actuator axis 40, actuator arms 50–58 with head gimbal assembly 60 placed among the disks.
Figure 1B:
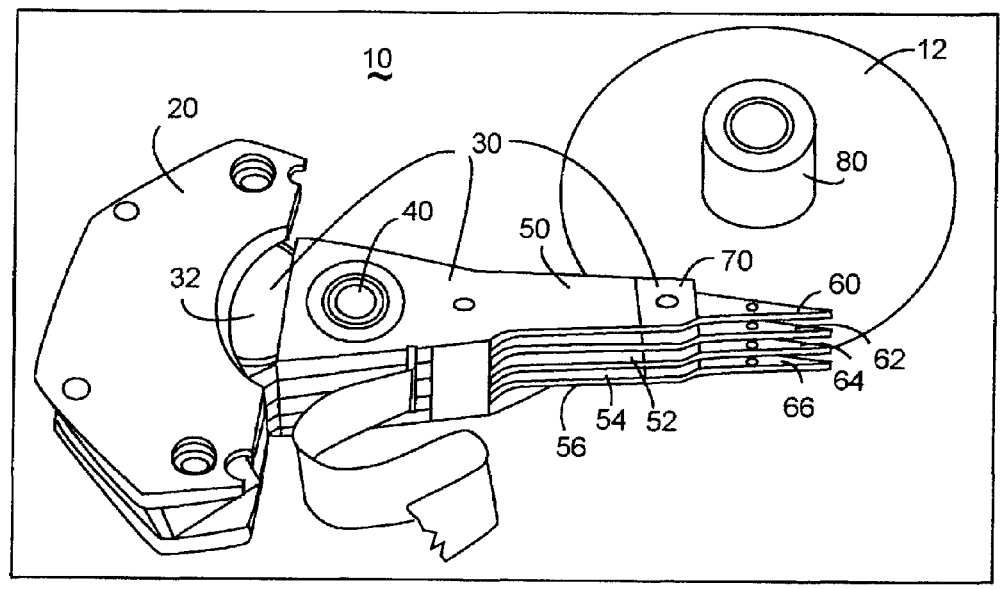
FIG. 1B illustrates a typical prior art, high capacity disk drive 10 with actuator 20 including actuator arm 30 with voice coil 32, actuator axis 40, actuator arms 50–56 and head gimbal assembly 60–66 with the disks removed.
Figure 2A:
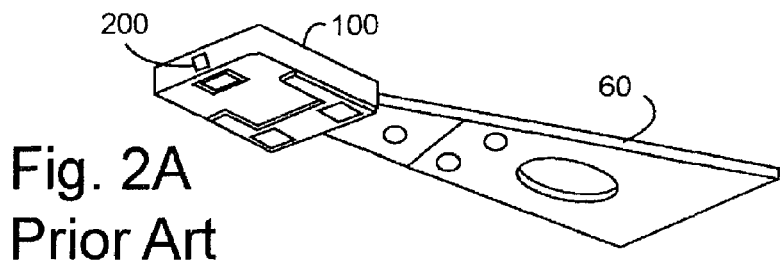
FIG. 2A illustrates a suspended head gimbal assembly 60 containing the MR read-write head 200 of the prior art.
Figure 2B:
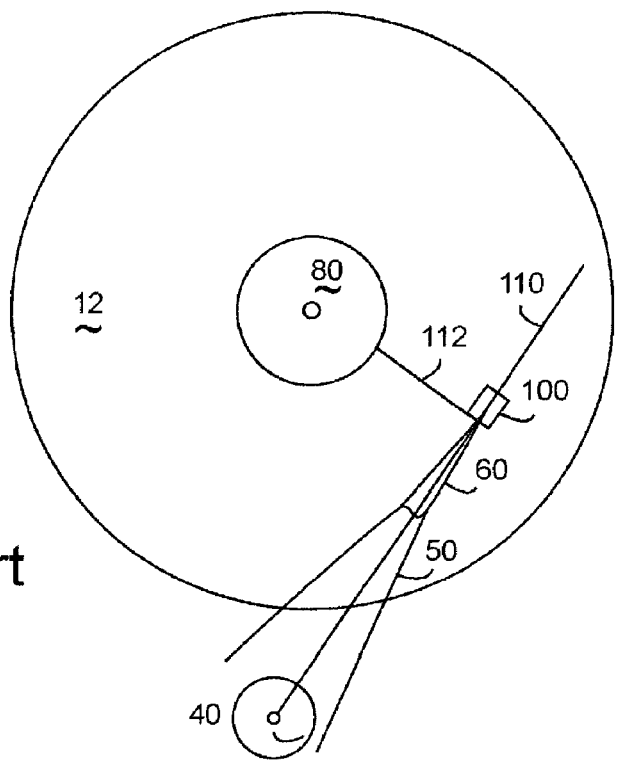
FIG. 2B illustrates the relationship between the principal axis 110 of an actuator arm 50 containing head gimbal assembly 60, which in turn contains slider 100, with respect to a radial vector 112 from the center of rotation of spindle hub 80 as found in the prior art.
Figure 2C:
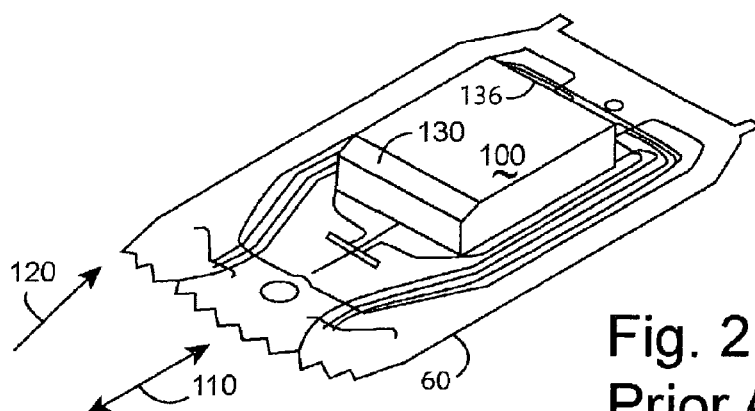
FIG. 2C illustrates the tip of the head gimbal assembly 60 containing slider 100, with first edge 130 regarding both the principal axis 110 of the actuator and primary wind direction 120 as found in the prior art.

Head gimbal assembly 60 includes at least one slider 100 including a read-write head and at least one airfoil boundary 300 as illustrated in FIG. 3A. The height of each of the airfoil boundaries 300 is at most the height of slider 100 and conforms to the air bearing. The disk drive includes at least one disk surface 12, and a head gimbal assembly 60 including at least one slider 100 for a read-write head 200 communicating with disk surface 12 as illustrated in FIGS. 2A and 2B.

Note that in today's disk drive technology, read-write head 200 preferably communicates with rotating disk surface 12 by accessing a track on the rotating disk drive surface.

The invention operates in a disk drive as follows. Disk surface 12 is rotated near the slider 100 to engage the read-write head 200 based upon an air bearing formed by the rotating disk surface 12, the head gimbal assembly 60 and the slider 100 containing the read-write head 200. At least one airfoil boundary 300 is provided to the slider 100 conforming to the air bearing to reduce air flow turbulence about the read-write head 200. The airfoil boundary 300 increases the reliability of the read-write head 200 communicating with the rotating disk surface 12 within the air bearing.

FIGS. 3B and 3C illustrate the effect of airfoil boundaries 300. FIG. 3B shows a head gimbal assembly of the prior art lacking the advantage of airfoil boundary 300. The airflow motion 120, in passing around slider 100, will experience the early onset of turbulence, as illustrated by arrows 180 and 182. This turbulence will tend to have a greater effect on the mechanical vibration of the slider body 100.

Both FIGS. 3B and 3C illustrate some turbulence 184 and 186 in the wake of slider 100. However, the head gimbal assembly of FIG. 3C has the advantage of reduced early turbulence due to the introduction of at least one airfoil boundary 300, essentially removing a significant amount of mechanical vibration from affecting the slider 100, due to early onset turbulence 180 and 182.

Referring again to FIG. 3A, it is often preferred that at least one airfoil boundary 300 is near the first edge boundary 130 of slider 100. Today's assembly processes for head gimbal assemblies usually require electrical bonding of the read-write head 200 to flexure on the suspension near the opposite, parallel, second edge 136 of slider 100, near read-write head 200. Given today's standard assembly processes, locating an airfoil boundary near the read-write head is less preferable.

FIG. 4A schematically illustrates the primary wind direction 120 with respect to head slider 100, first edge 130, and principal axis 110 for the Middle Position.

FIG. 4B schematically illustrates the primary wind direction 120 with respect to head slider 100, first edge 130, and principal axis 110 for the Inside Position.

FIGS. 4C schematically illustrates the primary wind direction 120 with respect to head slider 100, first edge 130, and principal axis 110 for the Outside Position.

The long axis of slider 100 is essentially the principal axis 110. FIG. 4A illustrates the principal wind direction 120 being parallel the principal axis 110, while FIGS. 4B and 4C illustrate a significant angular difference between wind direction 120 and principal axis 110.

In some cases, the Outside Position may be the Middle Position. In some cases the Inside Position angle may not be symmetric with the Outside Position angle as illustrated in FIGS. 4B and 4C.

More than one airfoil boundary may be preferred in certain cases. Also, an airfoil boundary may be near more than one slider edge. FIGS. 4D to 4G illustrate some alternative preferences in certain cases.

FIG. 4D illustrates a head gimbal assembly including an airfoil boundary 300 near not only the first slider edge 130, but also airfoil boundaries 302 and 304 near two parallel edges 132 and 134, respectively, connecting first slider edge 130 and second slider edge 136 near the read-write head 200.

FIG. 4E illustrates a head gimbal assembly including several airfoil boundaries near not only the first slider edge 130, but also near two parallel slider edges 132 and 134, connecting first slider edge 130 and second slider edge 136 near the read-write head 200.

FIG. 4F illustrates a head gimbal assembly including an airfoil boundary near not only the first slider edge 130, but also near one of two parallel slider edges 132, connecting first slider edge 130 and second slider edge 136 near the read-write head 200.

FIG. 4G illustrates a head gimbal assembly including several airfoil boundaries near not only the first slider edge 130, but also near two parallel, but non-symmetric slider edges 132 and 134, connecting first slider edge 130 and second slider edge 136 near the read-write head 200.

In many cases, one or more of airfoil boundaries 300–304 will preferably approximate a convex, often smooth, hull about at least part of slider 100. However, as illustrated by FIGS. 3A, 4E and 4G, the airfoil boundary need not be smooth. FIG. 4F illustrates one approximation, which is not precisely a convex hull at the juncture of slider edges 130 and 132, but which operates as disclosed herein.

An airfoil boundary 300–304 may be included in either the slider 100 or head suspension 60, but with today's technology, the airfoil boundaries are preferably part of the head suspension 60. The head gimbal assembly 60 preferably includes at least one of the following: a rigidly attached layer forming the airfoil boundary 300 and/or a rigidly attached pad forming the airfoil boundary 300. The layer and/or pad are preferably composed essentially of light rigid materials. The light rigid materials may include one or more members of a phenol family, members of a polysulfone family, and members of a polyamide family. Note that in certain situations a layer may form at least one of the airfoil boundaries, and other of the airfoil boundaries may be formed by one or more pad(s).

The preceding embodiments have been provided by way of example and are not meant to constrain the scope of the following claims.

The invention claimed is:

1. A head gimbal assembly for accessing a rotating disk surface in a disk drive, comprising:
   a slider including at least one read-write head communicating with said rotating disk surface within an air bearing;
   at least one airfoil boundary reducing air flow turbulence about said slider induced by said head gimbal assembly accessing said rotating disk surface; and
   said slider rigidly attached to a head suspension including said at least one of said airfoil boundaries;
   wherein each of said at least one airfoil boundaries has a height less than or equal to the height of said slider and conforming to said air bearing; and
   wherein said airfoil boundary reducing said air flow turbulence about said slider, increases the reliability of said read-write head communicating with said rotating disk surface within said air bearing;
   wherein said slider is further comprised of a first slider edge, and a second slider edge parallel to said first slider edge;
   wherein said second slider edge is near to said read-write head; and
   wherein at least one of said airfoil boundaries is near to said first slider edge;
   wherein at least one of said airfoil boundaries approximates a smooth convex hull on the generally windward side about said slider.

2. The apparatus of claim 1, further comprising
   at least two of said airfoil boundaries reducing air flow turbulence about said slider induced by said head slider assembly accessing said rotating disk surface.

3. The apparatus of claim 2,
   wherein said slider is further comprised of a third slider edge and a fourth slider edge, each perpendicularly connecting said first slider edge and second slider edge; and
   wherein each of said airfoil boundaries is near to at least one member of a slider edge collection comprising said first slider edge, said third slider edge and said fourth slider edge.

4. The apparatus of claim 3,
wherein said slider edge collection consists essentially of said first slider edge, said third slider edge and said fourth slider edge.

5. The apparatus of claim 1,
wherein said head gimbal assembly includes at least one member of the group consisting of:
a rigidly attached layer forming said airfoil boundary; and
a rigidly attached pad forming said airfoil boundary.

6. The apparatus of claim 5,
wherein said layer is composed essentially of a first of a light rigid material;
wherein said pad is composed essentially of a second of said light rigid materials; and
wherein at least one of said light rigid materials includes at least one of a member of a phenol family, a member of a polysulfone family, and a member of a polyamide family.

7. The apparatus of claim 1, wherein said slider includes at least one of said airfoil boundaries.

8. An actuator comprising at least one of said head gimbal assemblies of claim 1.

9. A disk drive comprising at least one of said actuators of claim 8.

10. A method of operating a disk drive including at least one disk surface, and a head gimbal assembly including a suspension rigidly attached to at least one slider for a read-write head to communicate with said disk surface, comprising the steps of:
rotating said disk surface near said slider to engage said read-write head based upon an air bearing formed by said rotating disk surface and said suspension and said slider containing said read-write head;
a fixed magnet actuator interacting with a time varying electromagnetic field induced by a voice coil to move an actuator arm including said head gimbal assembly; and
providing at least one airfoil boundary to said slider conforming to said air bearing to reduce air flow turbulence about said slider;
wherein the step providing said airfoil boundary, is further comprised of:
said airfoil boundary increasing the reliability of said read-write head communicating with said rotating disk surface within said air bearing;
wherein each of said at least one airfoil boundaries has a height less than or equal to the height of said slider and conforming to said air bearing; and
wherein at least one of said airfoil boundaries approximates a smooth convex hull on the generally windward side about said slider.

11. The method of claim 10,
wherein said slider is further comprised of a first slider edge, and a second slider edge parallel to said first slider edge;
wherein said second slider edge is near to said read-write head; and
wherein at least one of said airfoil boundaries is near to said first slider edge.

12. The method of claim 10,
wherein the step providing said at least one airfoil boundary, is further comprised of:
providing at least two of said airfoil boundaries reducing air flow turbulence about said slider induced by said head slider assembly accessing said rotating disk surface.

13. The method of claim 12,
wherein said slider is further comprised of a third slider edge and a fourth slider edge, each perpendicularly connecting said first slider edge and said second slider edge; and
wherein each of said airfoil boundaries is near to at least one member of a slider edge collection comprising said first slider edge, said third slider edge and said fourth slider edge.

14. The method of claim 10,
wherein at least one of said airfoil boundaries is included in a member of the group consisting of said slider and a head suspension rigidly attached to said slider.

15. A head gimbal assembly for accessing a rotating disk surface in a disk drive, comprising:
a slider including at least one read-write head communicating with said rotating disk surface within an air bearing; and
at least one airfoil boundary reducing air flow turbulence about said slider induced by said head gimbal assembly accessing said rotating disk surface;
wherein each of said at least one airfoil boundaries has a height less than or equal to the height of said slider and conforming to said air bearing; and
wherein said airfoil boundary reducing said air flow turbulence about said slider, increases the reliability of said read-write head communicating with said rotating disk surface within said air bearing;
wherein a fixed magnet actuator interacts with a time varying electromagnetic field induced by a voice coil to move an actuator arm including said head gimbal assembly;
wherein at least one of said airfoil boundaries approximates a smooth convex hull on the generally windward side about said slider.

16. The apparatus of claim 15,
wherein said slider is further comprised of a first slider edge, and a second slider edge parallel to said first slider edge;
wherein said second slider edge is near to said read-write head; and
wherein at least one of said airfoil boundaries is near to said first slider edge.

17. The apparatus of claim 16, further comprising
at least two airfoil boundaries reducing air flow turbulence about said slider induced by said head gimbal assembly accessing said rotating disk surface.

18. The apparatus of claim 17,
wherein said slider is further comprised of a third slider edge and a fourth slider edge, each perpendicularly connecting said first slider edge and said second slider edge; and
wherein each of said airfoil boundaries is near to at least one member of a slider edge collection comprising said first slider edge, said third slider edge and said fourth slider edge.

19. The apparatus of claim 18,
wherein said slider edge collection consists essentially of said first slider edge, said third slider edge and said fourth slider edge.

20. The apparatus of claim 15, further comprising:
wherein at least one of said airfoil boundaries is included in a member of the consisting of said slider and a head suspension rigidly attached to said slider.

21. The apparatus of claim 20,
wherein said head gimbal assembly includes at least one member of the group consisting of:
a rigidly attached layer forming said airfoil boundary; and
a pad forming said airfoil boundary.

22. The apparatus of claim 21,
wherein said layer is composed essentially of a first of a light rigid material;
wherein said pad is composed essentially of a second of said light rigid materials; and
wherein at least one of said light rigid materials includes at least one of a member of a phenol family, a member of a polysulfone family, and a member of a polyamide family.

23. An actuator comprising at least one of said head gimbal assemblies of claim 15.

24. A disk drive comprising at least one of said actuators of claim 23.

* * * * *